United States Patent [19]
Kitsuregawa et al.

[11] Patent Number: 5,603,028
[45] Date of Patent: *Feb. 11, 1997

[54] METHOD AND APPARATUS FOR DATA DISTRIBUTION

[75] Inventors: Masaru Kitsuregawa, Chiba-ken; Shinya Fushimi, Kanagawa-ken, both of Japan

[73] Assignee: Mitsubishi Denki Kabushiki Kaisha, Tokyo, Japan

[ * ] Notice: The term of this patent shall not extend beyond the expiration date of Pat. No. 5,396,628.

[21] Appl. No.: 381,524

[22] Filed: Jan. 31, 1995

Related U.S. Application Data

[63] Continuation-in-part of Ser. No. 24,188, Feb. 26, 1993, Pat. No. 5,396,628.

[30] Foreign Application Priority Data

Mar. 2, 1992 [JP] Japan ........................... 4-44780

[51] Int. Cl.$^6$ ........................... G06F 13/38
[52] U.S. Cl. ............. 395/675; 364/281; 364/928.1; 364/942.7; 364/DIG. 1
[58] Field of Search ................... 395/700, 650; 364/DIG. 1, 281

[56] References Cited

U.S. PATENT DOCUMENTS

| | | |
|---|---|---|
| 3,732,548 | 5/1973 | Howells et al. . |
| 4,482,996 | 11/1984 | Wilson et al. . |
| 4,621,359 | 11/1986 | McMiller . |
| 5,155,851 | 10/1992 | Krishnan .................. 395/650 |
| 5,212,793 | 5/1993 | Donica et al. ............. 395/700 |
| 5,237,683 | 8/1983 | Kitsuregawa et al. . |

FOREIGN PATENT DOCUMENTS

| | | |
|---|---|---|
| 61-83392 | 6/1986 | Japan . |
| 62-21398 | 1/1987 | Japan . |
| 62-54350 | 3/1987 | Japan . |
| 8602511 | 4/1986 | WIPO . |

OTHER PUBLICATIONS

Sakai et al., "Interconnection Network for Bucket Distribution on Relational Algebra Machine".
Patent Abstract of Japan, vol. 11, No. 62, Feb. 25, 1987, "Parallel Logic Simulation Device".
Ahmadi et al, "A High–Performance Switch Fabric for Integrated Circuit and Packet Switching", IEEE Proceedings of the Confion Computer.
Comm., Infocom, vol. conf. 7, Mar. 27–31, 1988, pp. 9–18.
Kitsuregawa et al, "Architecture and Performance of Relational Algebra Machine GRACE", Proc. of Inter. Conf. on Parallel Processing, 1984, pp. 241–250.

*Primary Examiner*—Kevin A. Kriess
*Assistant Examiner*—Majid Banankah
*Attorney, Agent, or Firm*—Wolf, Greenfield & Sacks, P.C.

[57] ABSTRACT

A data distribution apparatus and method for distributing data from a first group of devices to a second group of devices through a series of controlled coupling units to evenly distribute processing load associated with the data among the second group of devices. The coupling units have memory for storing values relating to an accumulated processing load of data distributed through the coupling unit. The coupling units distribute data and/or descriptive indicators representing data based on kinds of data, such as job classes, and processing loads that are previously estimated. By distributing based on processing load, a plurality of processes can be performed nearly simultaneously without excess waiting.

11 Claims, 8 Drawing Sheets

METHOD AND APPARATUS FOR DATA DISTRIBUTION

CROSS-REFERENCE TO RELATED APPLICATION

This application is a continuation-in-part of U.S. Ser. No. 08/024,188, filed Feb. 26, 1993, now U.S. Pat. No. 5,396, 628. This application is hereby expressly incorporated by reference.

FIELD OF THE INVENTION

The present invention relates to a method and apparatus for distributing data.

BACKGROUND OF THE INVENTION

Figure 4:
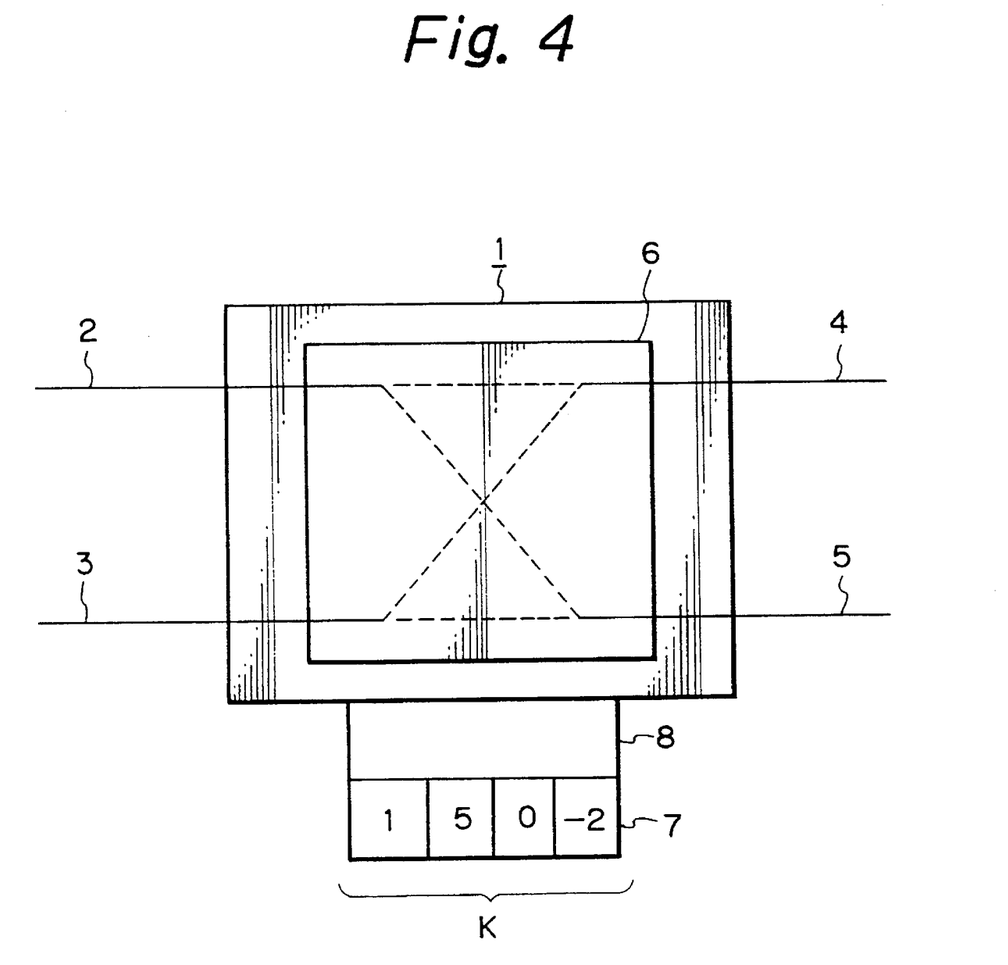
FIG. 4 is a schematic of a coupling unit in a conventional data distribution apparatus.

FIG. 4 illustrates coupling units employed in a data distribution apparatus as proposed in Japanese Patent Application No. 185561/90. Coupling unit 1 has two data input lines 2, 3, two data output lines 4, 5, a switch 6 for switching the data connecting patterns in the coupling unit, a group 7 of counters corresponding to each kind of data or work unit, and a control unit 8 for controlling the group of counters to switch the data connecting patterns in accordance with the contents of counter group 7. A first pattern, in which input lines 2, 3 are connected to output lines 4, respectively (a "parallel pattern"), and a second pattern in which input lines 2, 3 are connected to output lines 5, 4, respectively (a "cross pattern") are shown.

Figure 5:
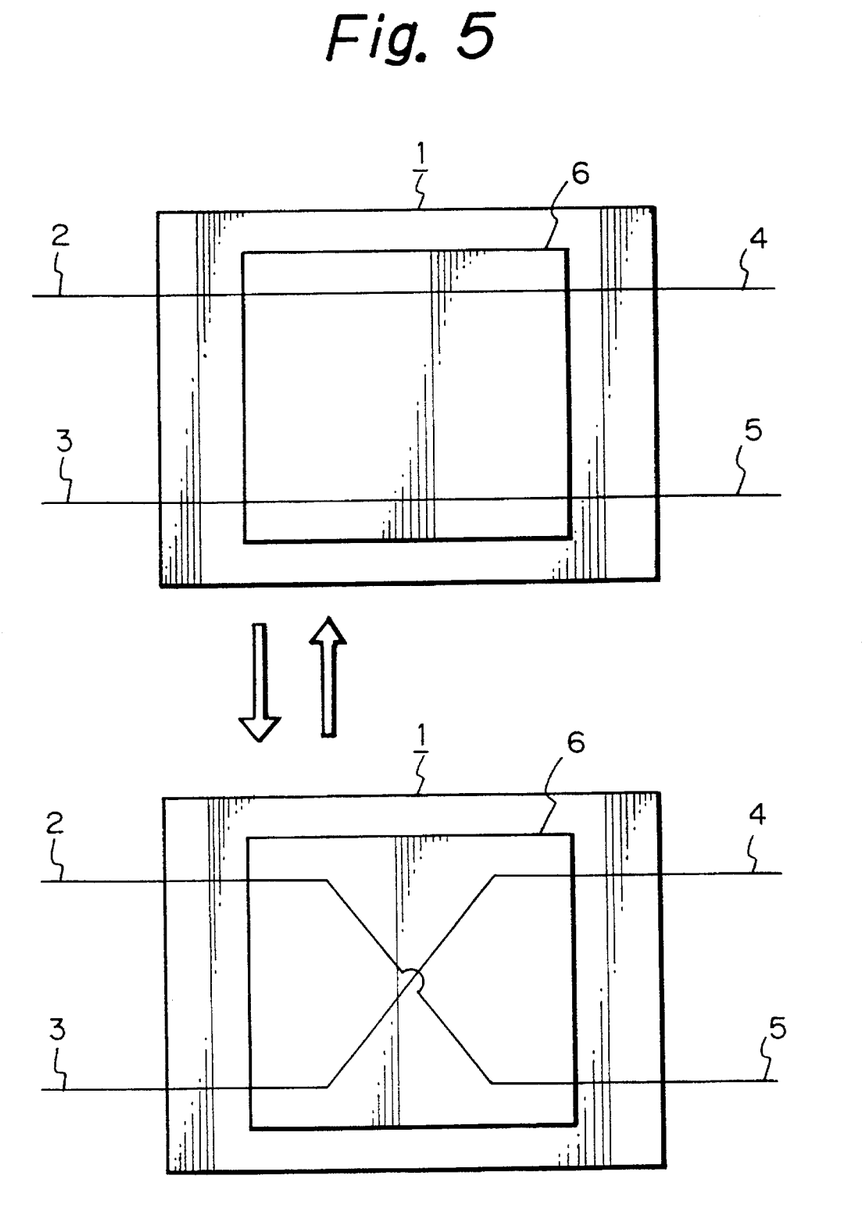
FIG. 5 are schematics showing data connecting patterns in the coupling units of FIG. 4.
Figure 6:
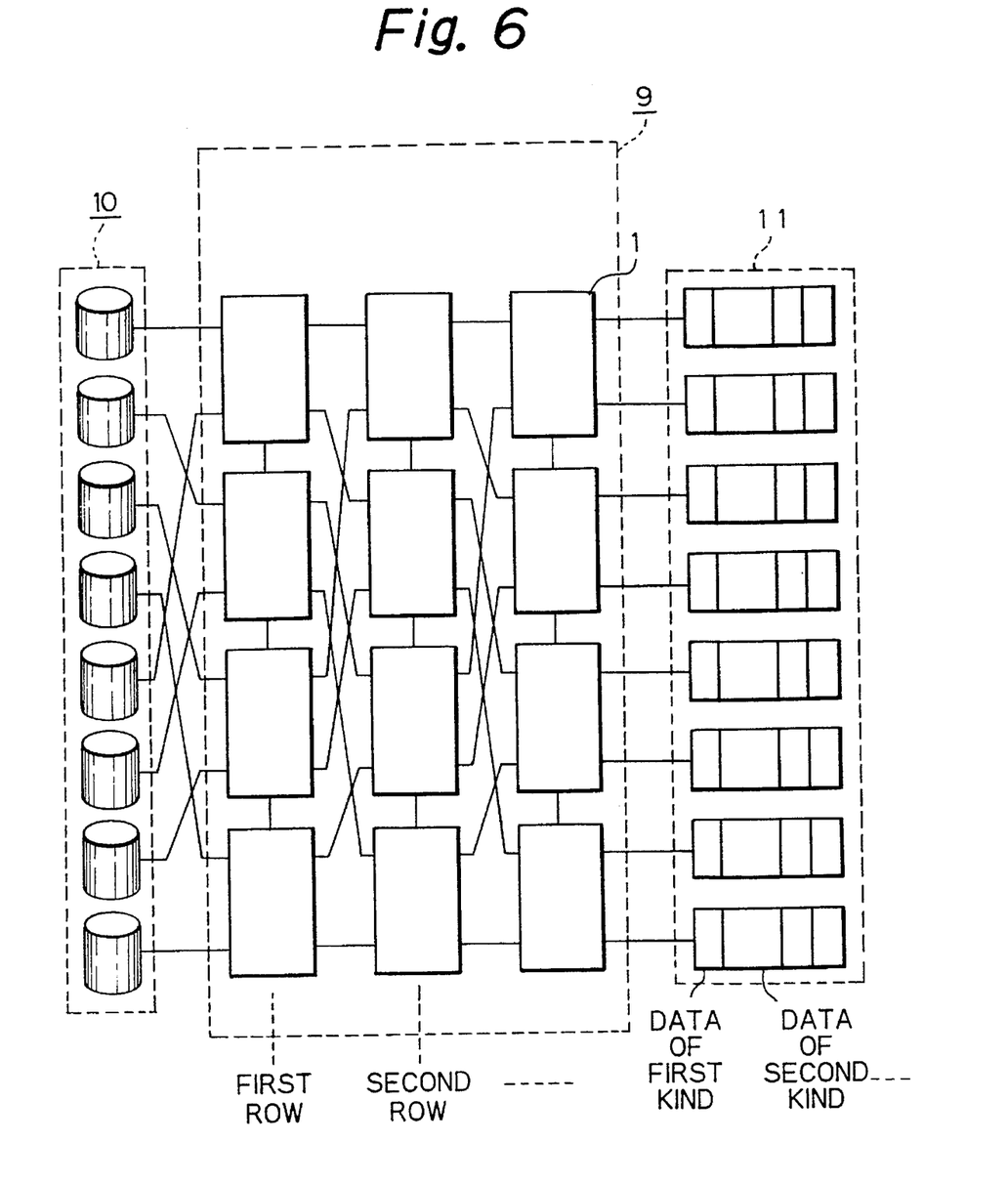
FIG. 6 is a schematic of the conventional data distribution apparatus and of first and second memory groups.

FIG. 5 illustrates two data connection patterns that are realized by switch 6 in coupling unit 1. In FIG. 5, the upper pattern is the parallel pattern and the lower pattern is the cross pattern. FIG. 6 illustrates the general construction of a conventional data distribution apparatus 9, which distributes data from a first memory group 10 to a second memory group 11.

In this system, coupling units 1 are arranged in a 4×3 matrix. Because first memory group 8 has eight memories, four units, each having two input lines, are provided in each vertical row and $\log_2 8 = 3$ rows in each horizontal row. Generally, in order to distribute data equally from a first group of N memories to a second group of N memories, it is necessary to form a data distributing apparatus having a group of coupling units which are arranged in a matrix of $(N/2) \times \log_2 N$ rows. It should be noted however that there are various other methods of arranging a network which have a plurality of coupling units, and that the technique according to the present invention may be similarly effectively applied to these methods. The details of a coupling unit arrangement such as that shown in FIG. 6 and other coupling unit arrangements are explained in the report of the Electronic Communication Society Proceedings, Vol. J86-D, No. 6, p. 1272.

The first memory group stores at a minimum the data or work units to be processed. The second memory group is used as a temporary storage area for processing the data or the work units stored in the first memory group. A plurality of coupling units 1 equally distribute in second memory group 11 The data or work units stored in first memory group 10.

For this description, it is assumed that the object of distribution is data only, and that data are transferred from the first group 10 of N memories to the second group 11 of N memories after being classified into K different kinds of data. More specifically, each of the data belongs to any one of a number of kinds 0 to K-1. As is known, if the total number Nx of data for the X-th (X=0, . . . , k-1) kind are transferred from the first group of memories to the second group of memories, Nx/N number of data for each memory are transferred to second group of memories. Thus, each Nx/N number of data are transferred to second memory group and the data for all kinds of the X-th (X=0, . . . , K-1) data are distributed to the second memory whereby data distribution will be completed.

As The data distribution operation is started, data are successively sent from first group 10 to either of data input lines 2, 3 or to the coupling units in the first row, which are connected with the respective memories in the first group. Each coupling unit 1 in the first row sets either one of the two connection patterns for switch 6 (FIG. 5), according to an instruction from control circuit 8, to move the input data in accordance with switch 6 and to transfer the data to coupling units in the second row which is connected to the coupling unit 1, through either of data output lines 4 or 5. This operation is then repeated. The respective coupling units 1 in the second row and those in The subsequent rows also repeat a similar operation. Data that are output through either of data output lines 4 or 5 of each coupling unit 1 belonging to the final row are stored separately in the respective corresponding memories in the second memory group while being arranged according to kind.

Control circuit 8 determines the connection patterns for switch 6 in the following manner. Prior to data distribution, the counters for the respective coupling unit 1 are all initialized to zero. The counters are controlled so that when data belonging to an X-th (X=0, . . . , K-1) kind are output from data output line 4, the X-th counter in the counter group is increased by "1". Also, if similar data are output from data output line 5, counter group 7 is controlled by control circuit 8 so that "1" is subtracted from the X-th counter in counter group 7. More specifically, if the count of the X-th counter in counter group 7 is positive at a certain point in time, it means that the majority of data of the X-th kind output from coupling unit 1 up to that time was delivered through data output line 4. Similarly, if the count of the counter in counter group 7 is "0", it means that only half of the number of the data of the X-th kind output from this coupling unit 1 up to that time were delivered through data output line 4, and the remaining half of the data were delivered through the data output line 5. As a result, data belonging to the X-th kind are equally distributed and output with respect to coupling unit 1. If the count of a counter it means that the majority of the data was delivered through data output line 5. In the example shown in FIG. 4, the counts of the counters are "1", "5", "0", and "–2", respectively. The "1" indicates that the number of data of the 0-th kind delivered by data output line 4 is greater than the data delivered by data output line 5 by one; "5" indicates that the number of data of the first kind delivered by data output line 4 is greater than the data delivered by data output line 5 by five; "0" indicates that the number of data of the second kind delivered by data output line 4 is equal to the data delivered by data output line 4; and "–2" indicates that the number of data of the third kind delivered by data output line 5 is greater than the data delivered by data output line 4 by two.

Thus, counter group 7 can be used to control the condition of local distribution of the data delivered through two output lines 4 and 5 of coupling unit 1 for each kind of data. To realize equal distribution of data for each kind of each of the output lines in the coupling unit, the counts of all the counters in group 7 are "0" when data distribution is completed.

Control circuit 8 of the respective coupling unit seeks the difference in the counter values corresponding to the kind of incoming data each time data are transmitted to data input line 2, 3. If the counter value is positive or zero, the control unit 8 connects data input lines 2 or 3 to data output lines 5, 4, respectively. If the counter value is negative, the control circuit connects data input lines 2, 3 no data output lines 4, 5, respectively, thus determining the connection patterns for switch 6. The data which have been sent to the data input lines are delivered to the data output lines in accordance with the thus determined connection pattern for switch 6, and further delivered to the group of coupling units connected to these data output lines.

For example, it is assumed that data which belong to the 0-th kind are input through data input line 2 and data which belong to the first kind are inputted through data input line 3, and that the counts of the counters corresponding to these kinds are "1" and "5" respectively. This means that the number of data of the 0-th kind input to the coupling unit and output by data output line 4 up to that time is greater than that of data output by data output line 5 by one, and similarly, the number of data of the first kind output by data output line 5 by five. In this case, since data distribution is deviated to data of the first kind rather than data of 0-th kind, it is advantageous if data input line 2 is connected to data output line 4 and data input line 3 is connected to data output line 5 to reduce such deviation of distribution of data of the first kind. According to the above described method, the difference between the counts of the two counters is negative since 1−5=−4, and the connection pattern for this value is selected for switch 6.

According to the data distribution apparatus as described above the number of data or work units may be equally distributed. Since the processing load of the data or the work units varies depending on their contents, however, the processing loads will not be equal, if data processing is executed by the second group of memories. For example, even if data are distributed equally from the first group of memories to the second group of memories, when the distributed data or work units are processed by the second group, the processing time is determined by completion of processing by the memory in the second memory group which is the most heavily loaded and takes the longest processing time, thus resulting in extended processing time. It was also a problem that many of the memories in the second memory group caused the working efficiency to be lowered. Under these circumstances, if a large number of data or work units are to be processed, the processing efficiency is lowered.

SUMMARY OF THE INVENTION

The present invention eliminates these problems by providing a data distribution apparatus and method which improves the efficiency of processing large amounts of data by equalizing the processing load of the data where work units distributed between a first group of memories and a second group of memories, rather than equalizing a number of data work units.

According to the present invention, a plurality of coupling units are provided between a first group of memories and a second group of memories and distribute a plurality of data or work units or other indicators, such as a process number that represents such work units from the first group to the second group of memories. The apparatus includes a group of memories that keep track of weighted values representing the processing load for each kind of data or work unit that is distributed and stores cumulative values of such weighted values. A controller controls and switches data connecting patterns in the coupling units in response to the contents of the memories that store weighed values. The controller detects deviations in the processing load of the data or the work units and compensates for such deviation by switching a data connection pattern of the coupling units.

The processing loads can be distributed so that the total load roughly equalized, and also so that same kinds of processing, such as job class, are also roughly equalized, without regard to a number of data or jobs.

BRIEF DESCRIPTION OF THE DRAWINGS

Other features and advantages will become apparent from the following detailed description and the claims when read in conjunction with the following figures in which:

DETAILED DESCRIPTION

Figure 1:
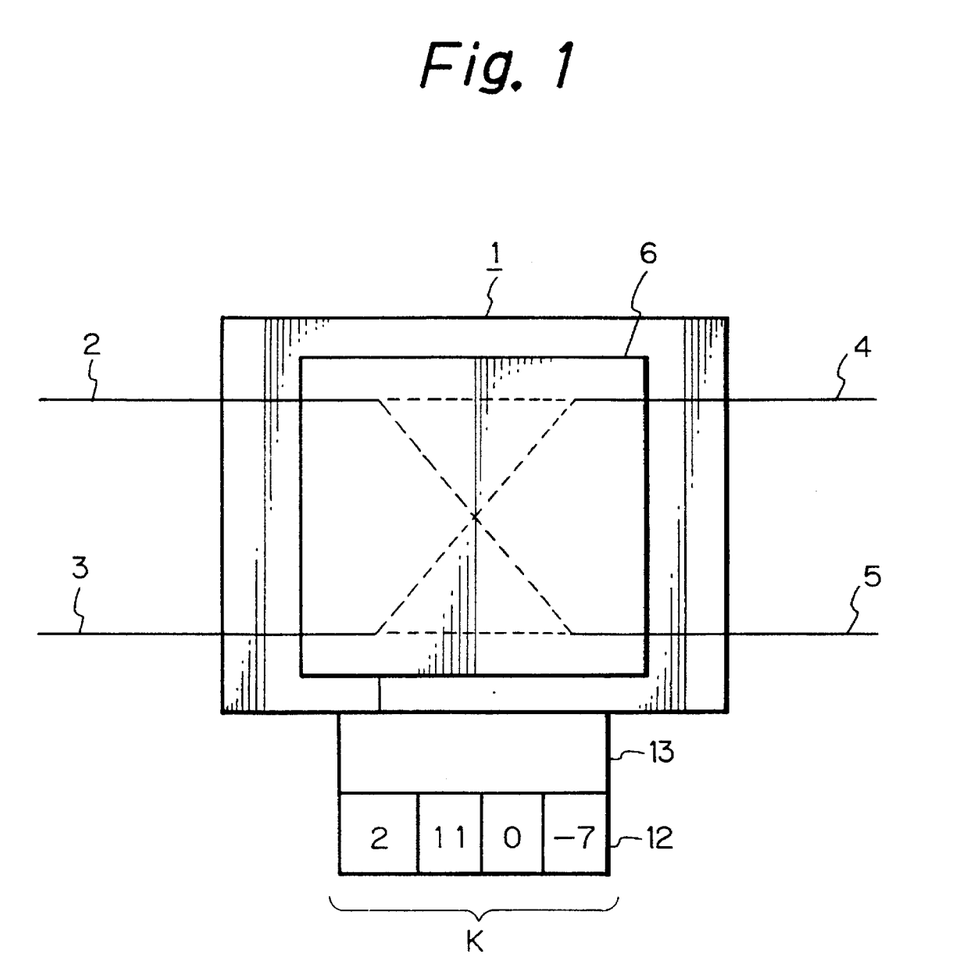
FIG. 1 is a schematic of coupling units employed in a data distribution apparatus according to an embodiment of the present invention.
Figure 2:
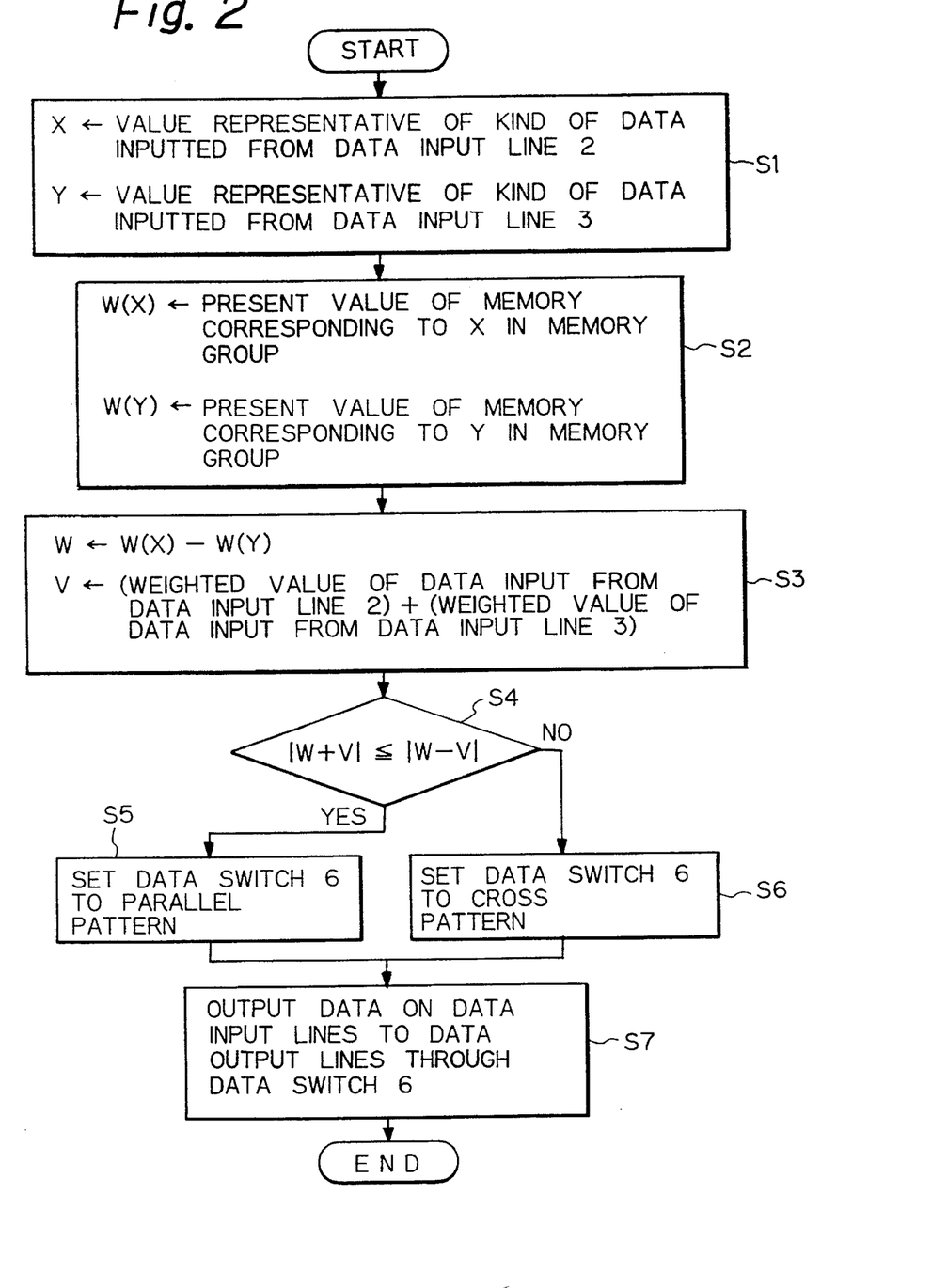
FIG. 2 is a flow chart illustrating the operation of the control circuit shown in FIG. 1.
Figure 3:
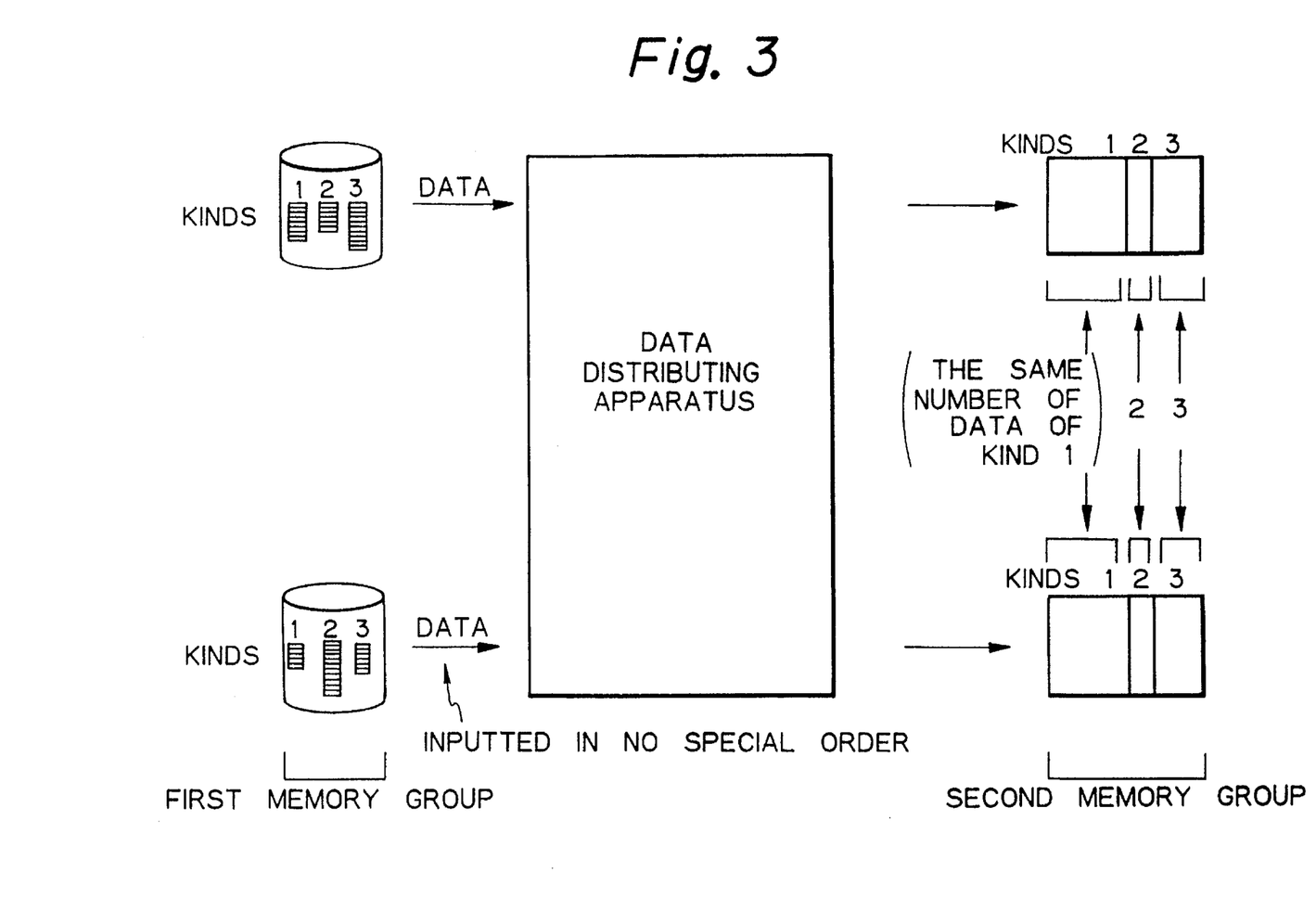
FIG. 3 is a schematic of the data distribution apparatus with first and second memory groups.

Referring to FIG. 1, a coupling unit 1 distributes data or work units from a first group of memories to a second group of memories. The coupling unit has two data input lines 2, 3, two data output lines 4, 5, a switch 6 for switching the data connecting patterns in the coupling unit, a group 12 of memories which accumulate weighted values for each kind of data or work unit, and a control circuit 13 which controls the group of memories and causes the switch to change the data connecting patterns in accordance with the contents of the memories in group 12. FIG. 2 is a flow chart illustrating operation of the control circuit. The general composition of the data distributing apparatus in accordance with this embodiment is the same as that shown in FIG. 3, except for the coupling unit.

The operation will next be explained. For the sake of explanation, it is assumed that data which have been classified into K number of kinds are transferred from a first group of N memories to a second group of N memories. As in the known apparatus, assuming a total Nx number of data are transferred from the first group to the second group, each Nx/N number of data are transferred to each memory in the second group. While in the prior art, each Nx/N number of data are transferred to the second memory group and all kinds of X-th (X=0, . . . , K-1) data are distributed to the second group memory, according to the present invention, assuming that the sum of the weighted value of the processing load of X-th (X=0, . . . , K-1) data is Wx, the data are distributed so that the sum of the weighted values of the data distributed to the respective memories of the second group for each kind will be Wx/N.

As the data distribution operations is commenced, data are successively sent from the first group of memories to either of data input lines 2, 3 of the coupling units in the first row, which are connected with the first group memory. Each coupling unit 1 in the first row sets one of the two patterns for switch 6 as shown in FIG. 5 according to an instruction from control circuit 13, moves the input data along switch 6 and transfers the data to the coupling unit in the second row through the data output lines connected to the coupling unit. This operation is then repeated. Coupling units 1 in the second row and those in the subsequent rows repeat a similar operation. The data which have been output from the data output lines of the respective coupling unit in the final row are separately stored in the respective corresponding memories in the second memory group while being arranged according to kind.

The control circuit determines the connection pattern of switch 6 in the following manner. Before distributing data, group 12 of memories for the respective coupling units are initialized to zero. When the data belonging to the X-th (X=0, ..., K-1) kind are output to the group of memories 12 from data output line 4, the weighted value of the processing load of the relevant data is added to the X-th memory in the group of memories. When similar data are output from data line 5, the control circuit controls so that the weighted value of the processing load for the concerned data is subtracted from the X-th memory in the group 12. Thus, if the value in the X-th memory in the group is positive at a certain point in time, it means that the majority of the processing load of the data of the X-th kind output from this coupling unit up to that time was delivered from the data output line 4. Similarly, if the count is "zero", the data of the X-th kind output from the coupling unit up to that time was delivered through the data output lines so that the total processing load has been delivered from data output line 5. In the example shown in FIG. 1, the counts of the group of memories at a certain point in time are "2", "11", "0", and "−1" respectively. The counts mean that the number of data of the 0-th kind that were delivered to data output line 4 is greater than those delivered to data output line 5 by two; the number of data of the first kind that were delivered to data output line 4 is greater than those delivered to data output line 5 by eleven; the number of data of the second kind that were delivered to data output line 5 is equal to those delivered to data output line 5; and the number of data of the third kind that were delivered to data output line 5 is less than those delivered to data output line 5 by seven.

Thus, it is possible by means of group 12 to control the condition of local distribution of the data load delivered through two output lines 4, 5 from the coupling unit 1 for each kind of data. To attain equal distribution for each kind of data, the respective coupling units output to the respective output lines an equal total processing load for each kind of data; this is equivalent to the fact that the counts of all the memories in the group in the respective coupling units are 0 when data distribution is completed.

For data that is input through data input line 2 or 3, when the definition of kinds of data can be readily made, it is possible to obtain the kind of data to which the input data belongs from the data itself. For example, eight different kinds of data may be defined by using three low-order bits in the bit expression of data as a kind identifier. In this case, the coupling unit itself can identify the kind of data by extracting these three low-order bits. When the definition of kinds of data is more complicated, it is possible to identify the kind for each piece, for example, by arithmetically obtaining the kind of data immediately before the data is delivered from the first memory group, adding such information to the top of the data, and referring to the top of the data in the coupling unit.

The processing load of each data is determined by an estimation method which does not relate to this invention. The load is then added to corresponding data as a field for carrying the estimated value as a code. Thus, the value in the field may be decoded and manipulated by the control circuit.

Referring to FIG. 2, each time data are delivered to the data input lines, the control circuit of the respective coupling units calculates the values in the memories corresponding to the kind of data input to data input line 3, subtracted from the values in the memories corresponding to the kind of data input to data input line 2 (steps S1–S3), and further seeks the sum of the weighted values associated with the data input to the data input lines. In this flow chart X and Y are the values for a kind of data input from input lines 2 and 3, respectively. W(X) and W(Y) are the present values of the memory corresponding to X and Y in the memory group. W=W(X)−W(Y); and V is the weighted sum to the values of data from input lines 2 and 3. If /W+V/</W−V/ (where /A/ is the absolute value of A), data input lines 2 and 3 are respectively connected to data output lines 4 and 5 (YES in steps S4 and S5). If /W+V/>/W−V/, data input lines 2 and 3 are respectively connected to data output lines 5 and 4 (NO in steps S4 and S6). Thus, the connecting pattern of switch 6 is determined (step 7). In this way, data that have been delivered by data input lines are sent to data output lines in accordance with the connection pattern of the switch as determined in the above-described manner and to the group of coupling units connected to the data output line.

For example, at a certain point in time, assume that data belonging to the 0-th kind have been input from data input line 2, and data belonging to the first kind have been input from data input line 3, and that the values in the memories belonging to these kinds are "2" and "11" respectively. If X=0 and Y=1, then W(X)=2, W(Y)=11, and W=W(X)−W(Y)=−9. Assuming that the weighted values of the processing load relating to these data are "1" and "5", respectively, V=1+5=6.

This means that the load of the data of 0-th kind input at that moment in time and output by data output line 4 is greater than those output by data output line 5 by two, and that the load of the first kind of data which were output by data output line 5 is eleven. In this case, since the distribution of data of the first kind is more deviated, it is advantageous if the data are transferred to reduce the deviation of distribution of the data of the first kind. If data input line 2 is connected to data output line 4 and data input line 3 is connected to data output line 5, the corresponding values in the group of memories are "3" for data of the 0-th kind and "6" for data of the first kind, thus resulting in less deviation of the data distribution. On the other hand, if data input line 2 were connected to data output line 5 and data input line 3 were connected to the data output line 4, the corresponding values in the group of memories would be "1" for data of 0-th kind and "16" for data of the first kind, thus resulting in greater deviation of the data distribution. As we indicated above, W=2−11=−9, while V=1+5=6. In this case /W+V/= /−9+6/=3 and /W−V/=/−9−6/=15 and since /W+V/</W−V/, data input line 2 is connected to data output line 4 and data input line 3 is connected to data output line 5 so that the connecting patterns reduce deviation of the data distribution.

According to the embodiment as described above, the values W obtained by subtracting the values in the memories corresponding to the kind of data input to data input line 3 from the values in the memories corresponding to the kind of data input to data input line 2, and the sum V of the weighted values associated with the data input to data input lines 2 and 3, are searched at the time of connection according to the connecting patterns, and the connection patterns are determined by executing a simple calculation. Alternatively, a further mathematically equivalent calculation may be executed for this purpose. Furthermore, the distributed matter may be an indicator representing the work unit, e.g., a processing number or job number instead of the data itself.

As explained above, according to the present invention, since the data, work units, or indicators representing the work units are equally distributed at the second group of memories as the distribution destination in terms of the processing loads of the data as the object of the distribution according to weighted values relative to the data or the work units, the processing time of The data or the work units distributed to the second group of memories after such distribution of the data or the work units may be equalized, and as a consequence, the processing time as a whole of the second group of memories may be improved and the operational efficiency of the second group of memories may be enhanced. Furthermore, repetition of data distribution and data processing enables a large amount of data to be executed and the efficiency in data processing to be enhanced.

Figure 7:
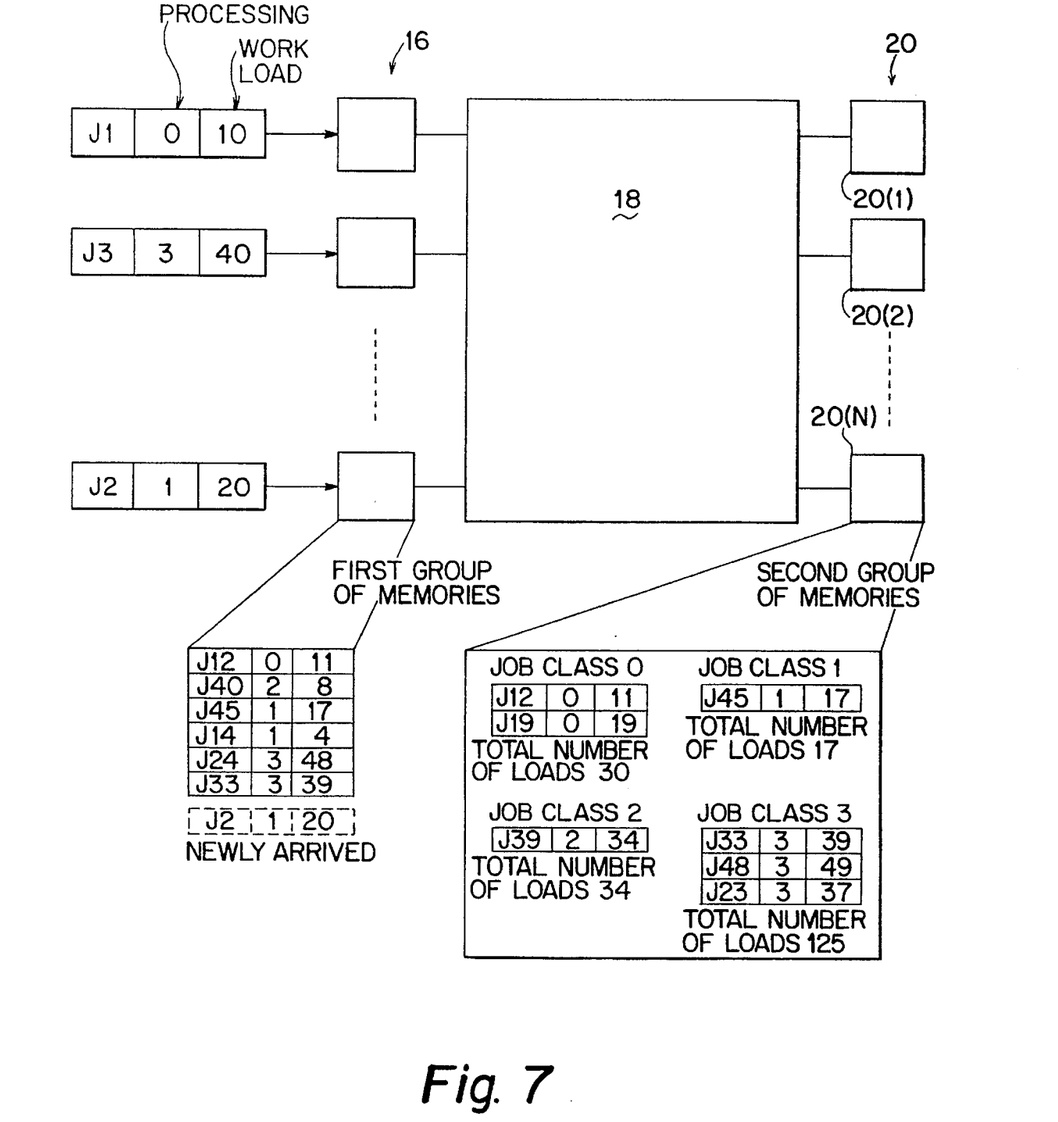
FIGS. 7 and 8 are block schematic representations of data distribution according to an embodiment.
Figure 8:
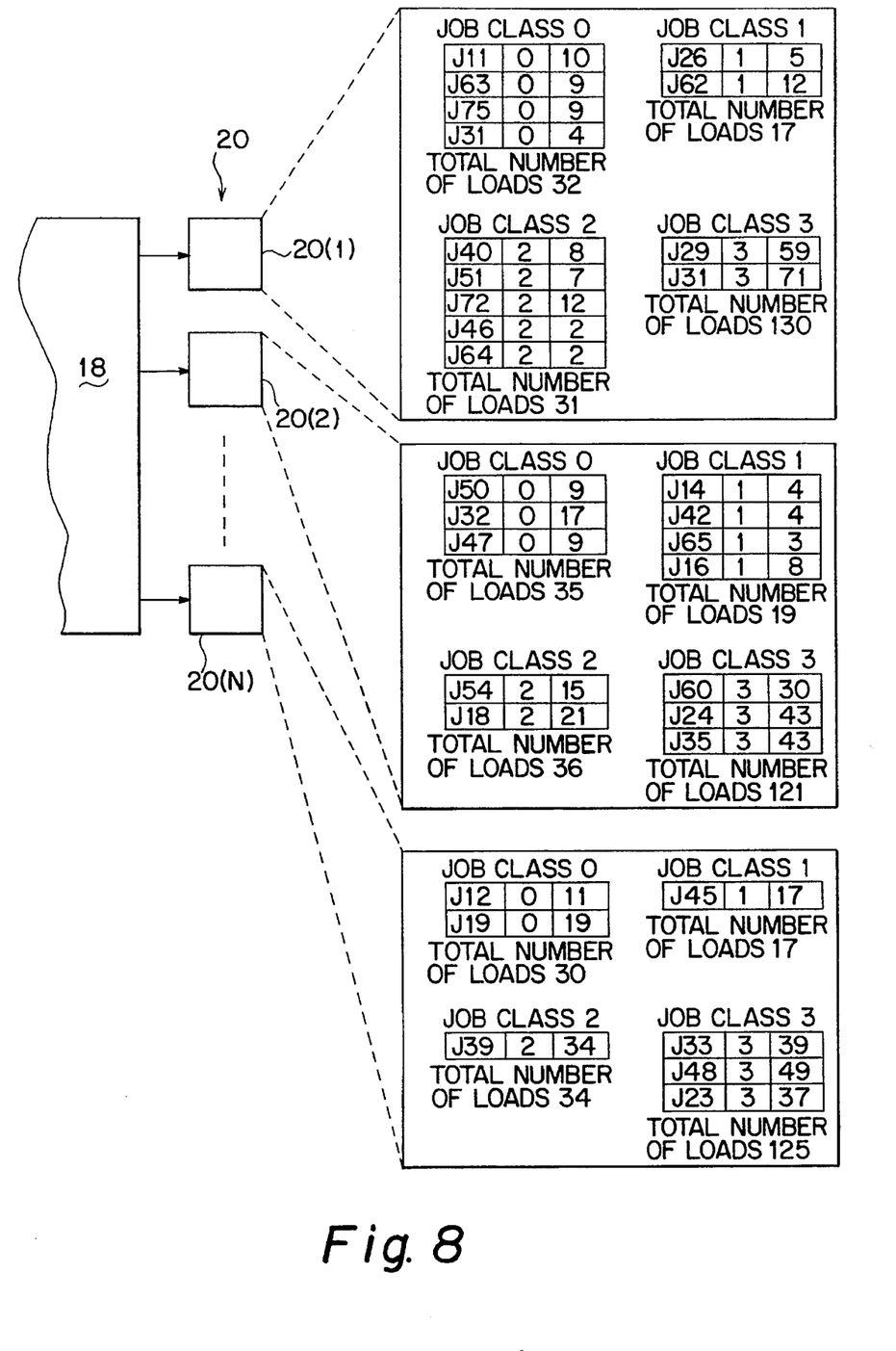

Data can also be distributed based at least in part on indicators representing data or work units, and including other information such as job class. Thus, the distributed information can be processing jobs Jx rather than the data per se. Referring to FIGS. 7 and 8 for an example, assume that there are four job classes (0–3) as the kinds of work loads, where job class 3 is the highest in terms of upper limit of capacity of a main memory, CPU time, intermediate file region on a disk, etc. for processing. An estimated value of execution time of a program to be processed as a job is assumed as an amount of work loads. For example, such an estimate value is provided to an apparatus of the present invention from a database management system as work load data.

For an example of a work load, assume a data base selects people who are 20 years old or over from a file T and outputs a list of the names of such people then a job J1 is defined as follows:

J1: SELECT NAME FROM T WHERE AGE>=20

Thus, job J1 is a job number (or processing number) that serves as an indicator representing data. If file T has, for example, 10,000 data records, the data base management system, for example, estimate that a value of its work load is 10. The next processing, however, selects from the file people who are 20 years old or over and yet younger than 60 years old. In this case:

J2: SELECT NAME FROM T WHERE AGE>=20 AND AGE<60

For job J2, the selected people are those who are 20 years old or over, and also younger than 60 years old. Thus, the time required for selecting each data to be outputted is estimated to be twice as much as that for J1, and therefore, the estimated value is 20. As is clear from above, work loads, i.e., estimated value of execution time, differ according to the contents to be processed even though the processing concerns the same data. Therefore, a problem arises if work units are distributed simply according to the number of data.

The same processing as described above is conducted in the following except that the processing is conducted in relation to file T2 instead of file T.

J3: SELECT NAME FROM T2 WHERE AGE>=20

If the data in file T2 is four times that of file T, i.e., if file T2 has 40,000 data records, an estimated value of a work load for the above processing is four times that for J1, i.e., 40.

These three processings can be classified according to job class. For example, it may be assumed that J1 is designated as a job class 0 and that J2, which uses much of the main memory, is designates a job class 1. If file T2 for J3 is large and J3 requires a large amount of an intermediary file region on a disk to be used in the middle of the processing, a user may designate J3 a job class 3.

The above example can be summarized in the following table:

TABLE I

| processing job | kind of processing (job class designated by a user) | work load (estimated value of execution time) |
| --- | --- | --- |
| J1 | 0 | 10 |
| J2 | 1 | 20 |
| J3 | 3 | 40 |

This information is externally provided to an apparatus according to the present invention. The weighted values associated with the data refers to values of work loads, (i.e., an estimated value of execution time), while the kind of data refers to a kind of processing (i.e., a job class), in the descriptive data.

Referring particularly to FIG. 7, for example, descriptive data concerning the process corresponding to J2 is input to the last memory (i.e., a newly arrived data) of the first group of memories. The thus inputted data consists of a job identifier J2, i.e., an indicator representing data; a kind of processing, i.e., job class 1; and a work load, i.e., that the estimated value of execution time is 20.

Data distribution apparatus 18 distributes the indicators of data Jx concerning the processing from first group 16 to second group 20 of memories. The tables in FIG. 7 show the results of such distribution at the last memory 20(N) of second group 20.

In last memory 20(N), processing is classified according to a job class and is stored accordingly. Job classes 0, 1, 2, and 3 have total loads of 30, 17, 34, and 125, respectively. The distribution apparatus of the present invention distributes among the second group of memories this descriptive data concerning the processing optionally inputted to the first group of memories. The descriptive data is distributed so that the job classes having the same number in the second group of memories have almost the same total number of loads throughout group 20 of memories as is indicated in the tables of FIG. 8.

As is clear from FIGS. 7 and 8 in the drawing, the same kinds of processing, i.e., the same job classes, in the memories of second group 20 have roughly the same total number of loads, namely, 210, 211, and 206 loads for memories 20(1), 20(2), and 20(N), respectively. However, even though they are roughly the same in terms of a total number of work loads, these memories have different numbers of descriptive data. For example, the job class 0 in last memory 20(N) has 30 work loads in total and consists of two descriptive data J12 and J19, whereas the job class 0 in first memory 20(1) has 32 work loads in total and consists of four descriptive data J11, J63, J75, and J81. In other words, the processing is conducted in such a manner that the same job classes have the same total weighted value. Therefore, as a result of the distribution, the job classes represented by the same numeral do not necessarily have the same number of data, although they have almost the same total values of work loads.

A discussion of work load in terms of job class and priority is also provided in a text, "Computer System Performance" by Hellerman and Conroy (McGraw-Hill 1975), which is expressly incorporated by reference.

Assuming each memory in the second group 20 of memories is connected to a data processing unit, work loads are distributed equally among the data processing units according to a kind of processing, such as a job class. If the work loads are not distributed equally among the data processing units, different data processing units require different time to complete assigned processing. In that case, it can take a long time before processing assigned to a data processing unit which has a large number of total loads starts. Furthermore, it also takes a long time to complete the processing and thus, the turn-around time also becomes long. Therefore, when a plurality of processing are inputted at once and waiting is necessary for all the processing to be completed, processings required a long time will delay the completion of a process in the data processing unit as a whole.

According to an apparatus of the present invention, however, where work loads are equally distributed, such a situation does not arise and respective data processing units complete a plurality of assigned processings almost simultaneously, thus accelerating the completion of a plurality of processings input at once. Furthermore, as work loads are equally distributed according to kind, the same kinds require the same sources necessary for processing, such as main memory of data processing unit, and disk capacity, which enable uniform processing by data processing units having the same constitution.

What is claimed is:

1. An apparatus for distributing processing load having a plurality of coupling units which are provided between a first group of devices and a second group of devices to distribute pieces of information of a plurality of different kinds received from said first group of devices to said second group of devices so that the processing load for each kind of information in said second group of devices is substantially equalized, wherein the pieces of information include descriptive indicators of data, wherein the processing load of at least some pieces of information of one kind is different from the processing load of other pieces of information of the same kind, wherein at least one of said coupling units comprises:

a data switch having a plurality of data input lines for receiving a plurality of pieces of information including descriptive indicators of data and a plurality of data output lines for outputting the plurality of pieces of information including the descriptive indicators of data;

memory means, coupled to the data switch, for accumulating and storing a cumulative value indicative of the processing load of the pieces of information of each kind of information outputted from said coupling unit, the cumulative value being determined based on characteristics of the descriptive indicators of the data; and a control circuit, having a control output coupled to the data switch, for detecting a deviation of the distribution of the processing load of the memory means, and for changing a data connection pattern in said data switch to minimize the deviation of the distribution of the processing load.

2. An apparatus for distributing processing load between a first group of devices and a second group of devices according to a predetermined rule, the apparatus comprising:

a plurality of coupling units, wherein each of the plurality of coupling units has a plurality of inputs and a plurality of outputs, and wherein each coupling unit of the plurality of coupling units includes:

a plurality of accumulators respectively corresponding to a plurality of different kinds of data units, and a control circuit which controls said accumulators and changes data connection patterns of the coupling unit on the basis of the contents of said accumulators, each of said accumulators accumulating and storing a cumulative value for a processing load of each kind of data unit outputted from said coupling unit, said control circuit being arranged to judge whether or not there is a deviation in the distribution of the processing load of descriptive indicators representing data transferred from said first device group to said second device group on the basis of the contents of said accumulators, and to change the data connection patterns in said coupling unit so that deviation in the processing load of the data represented by the descriptive indicators is corrected, and to thereby distribute descriptive indicators representing data units to said second group of devices, the processing load of some data of one kind of data unit is different from other data of the same one kind of data unit.

3. In an apparatus for distributing processing load having a plurality of coupling units which are provided between a first group of devices and a second group of devices, each coupling unit having a data switch which has two data input lines for receiving two pieces of information and two data output lines for outputting two pieces of information, a processing load for each piece of information being determined, a method for distributing to said second group of devices the processing load of a plurality of pieces of information received from said first group of devices, the pieces of information including descriptive indicators of data, said method comprising the steps of:

recognizing the kinds of said two pieces of information;

using the descriptive indicators of data, accumulating and storing cumulative values of the processing load for each of the pieces of information outputted from said output lines for each kind of information; and changing a connection pattern in said data switch based on the descriptive indicators of the processing load for each of the two pieces of information and based on said cumulative values.

4. The apparatus of claim 1, wherein said descriptive indicators include a representation of a job to be processed and an associated processing load of the job to be processed.

5. The apparatus of claim 2, wherein said descriptive indicators include a representation of a job to be processed and an associated processing load of the job to be processed.

6. The method of claim 3, wherein said descriptive indicators include a representation of a job to be processed and an associated processing load of the job to be processed.

7. The apparatus of claim 1, wherein the kinds of data are each user-identified job classes and wherein each of the job classes has an associated processing load.

8. The apparatus of claim 2, wherein the kinds of data are each user-identified job classes and wherein each of the job classes has an associated processing load.

9. The method of claim 3, wherein the kinds of data are each user-identified job classes and wherein each of the job classes has an associated processing load.

10. A coupling unit having a plurality of data inputs and a plurality of data outputs for coupling a plurality of pieces of information of a plurality of different kinds from a first group of devices to a second group of devices, each piece of information including a descriptive indicator having a value that indicates a processing load associated with the piece of information, the coupling unit coupling the pieces of information such that a total processing load associated with the plurality of pieces of information is substantially equally divided among the second group of devices for each of the different kinds of information, the coupling unit comprising:

- a data switch having a plurality of data inputs, a plurality of data outputs, and a control input, the data switch being responsive to a control signal at the control input for coupling each of the plurality of inputs with one of the plurality of outputs;
- a plurality of memories, each of the plurality of memories storing a cumulative value for one of the plurality of kinds of information, the cumulative value indicating relative distribution of the total processing load of the one of the plurality of kinds of information among the plurality of outputs of the data switch; and
- a control circuit coupled to the plurality of memories and to the data switch to provide the control signal to the data switch to set a data connection pattern of the data switch based on the descriptive indicator of at least one piece of information at one of the plurality of inputs and based on the cumulative value corresponding to the kind of information of the at least one piece of information.

11. The coupling unit of claim 10, wherein the descriptive indicator includes a representation of a job to be processed and an associated processing load of the job to be processed.

* * * * *

UNITED STATES PATENT AND TRADEMARK OFFICE

CERTIFICATE OF CORRECTION

PATENT NO. : 5,603,028

DATED : February 11, 1997

INVENTOR(S): Masaru Kitsuregawa and Shinya Fushimi

It is certified that error appears in the above-identified patent and that said Letters Patent is hereby corrected as shown below:

On the title page:

At [73] Assignee: Please add after "Mitsubishi Denki Kabushiki Kaisha" -- and Masaru Kitsuregawa, Chiba-ken, Japan --.

Signed and Sealed this

Twenty-ninth Day of July, 1997

Attest:

BRUCE LEHMAN

*Attesting Officer*     *Commissioner of Patents and Trademarks*